USOO5195133A

United States Patent [19]
Kapp et al.

[11] Patent Number: 5,195,133
[45] Date of Patent: Mar. 16, 1993

[54] APPARATUS AND METHOD FOR PRODUCING A DIGITIZED TRANSACTION RECORD INCLUDING AN ENCRYPTED SIGNATURE

[75] Inventors: Michael A. Kapp, New Philadelphia; Robert L. Protheroe, Cambridge; Albert Onega, Lore City, all of Ohio

[73] Assignee: NCR Corporation, Dayton, Ohio

[21] Appl. No.: 640,199

[22] Filed: Jan. 11, 1991

[51] Int. Cl.[5] .............................................. H04L 9/32
[52] U.S. Cl. ............................................ 380/9; 380/22; 380/23; 380/24; 380/43; 380/49; 380/55; 382/3; 235/379; 235/380
[58] Field of Search ...................... 380/9, 10, 23, 24, 25, 380/49, 54, 55, 22, 21, 30, 43; 235/379, 380; 382/3; 356/71

[56] References Cited
U.S. PATENT DOCUMENTS

| 3,618,019 | 11/1971 | Nemirovsky et al. | 382/3 |
| 4,020,463 | 4/1977 | Himmel | 382/3 X |
| 4,202,626 | 5/1980 | Mayer, Jr. et al. | 356/71 |
| 4,385,285 | 5/1983 | Horst et al. | 382/3 |
| 4,467,139 | 8/1984 | Mollier | 380/23 |
| 4,724,542 | 2/1988 | Williford | 382/3 |
| 4,734,859 | 3/1988 | Hamaguchi et al. | 364/408 |
| 4,752,965 | 6/1988 | Dunkley et al. | 382/3 |
| 4,809,195 | 2/1989 | Bechet | 382/3 X |
| 4,993,068 | 2/1991 | Piosenka et al. | 380/23 |

Primary Examiner—Bernarr E. Gregory
Attorney, Agent, or Firm—Biebel & French

[57] ABSTRACT

A method and system for generating a completed payment document ready for signature in image form. The document is signed by a customer and a copy of the signature is captured in digital form. Thereafter the signature is encrypted and saved along with a digital record of the transaction.

17 Claims, 11 Drawing Sheets

FIG. 6

```
                    ANY STORE

6/7/90                              137124

SOCKS, WHITE
  1246794                             $7.00

SHOES, BLACK
  4679174                             $73.45

SUB                                 $80.45
  TAX                                 $ 5.23

TOTAL                               $85.68
```

| CREDIT RECEIPT | ANY STORE<br>10 MAIN ST.<br>NY, NY 10003 |
|---|---|
| DATE 01/04/80 | EXPIRES 07/87 |
| SUB $80.45 | NO. 77996849436768 |
| TAX $5.23 | TEST ACCOUNT |
| TOTAL $85.68 | |

SIGN HERE X *John Doe*

PAYMENT OF CHARGE SHALL BE MADE
UPON DEMAND OR PURSUANT TO
APPLICABLE CHARGE ACCOUNT

APPARATUS AND METHOD FOR PRODUCING A DIGITIZED TRANSACTION RECORD INCLUDING AN ENCRYPTED SIGNATURE

CROSS REFERENCE TO RELATED APPLICATION

This application is related to commonly-owned, co-pending application, Ser. No. 07/575,069 filed Aug. 30, 1990, now U.S. Pat. No. 5,153,261.

BACKGROUND OF THE INVENTION

This invention relates to a system and a method for processing signature-based payment transactions and more particularly relates to such a system and method in which a merchant's records of payment may be generated and maintained electronically without generation or use of paper records except those delivered to customers at the point of sale.

In retailing and similar areas, the volume of transactions is often such that management of paper records is burdensome. Therefore paper records are being replaced by digital storage media wherever feasible. However, digital storage devices have not been able to eliminate the need for paper storage in many financial transactions requiring consumer approval. Typical examples are transactions involving account debit (including check) and charge receipts. In such transactions paper documentation bearing a human signature has continued to be the norm. The storage and retrieval of such records is both inefficient and costly.

While techniques have been developed for producing digitized facsimiles of human signatures and processing such digitized facsimiles to verify the authenticity thereof, there has been no practical means of correlating a digitized signature with a specific transaction. Only by preserving a record of the transaction with the original copy of the approving signature thereon has it been possible to satisfy the commercial need for proof of an obligation. Thus paper records have persisted in the face of strong incentives for their elimination.

It is therefore seen that there is a need for a practical method and system for capturing an image of a signature in digital form and combining it with a digital record of the transaction itself. There is a further need for such a system which includes an effective defense against attempted fraud. In particular, there is a need for a mechanism for assuring that a signature purportedly approving a commercial obligation was captured at the time of a questioned transaction and is not a genuine signature obtained on some other occasion and fraudulently merged into the digital record of the transaction.

SUMMARY OF THE INVENTION

The present invention provides a method and system for generating a completed obligation or payment document, such as a charge receipt or check ready for signature in image form, and further provides a means for capturing a customer signature by means of a stylus-activated mechanism and integrating the signature into the document image. The resulting image may then be printed to provide a hard copy document for customer records, and may be stored and transmitted in electronic form to provide an electronic image for records maintained and used by the merchant and/or financial institution.

In accordance with one embodiment of the invention, a user activated terminal for the entry of transaction-related data comprises a transaction input means for creating a digitized debit record for the transaction, a stylus for manually actuated cursive movement corresponding to the writing of an approving signature for the debit record, capture means responsive to movement of the stylus for creating a signature record which is a digital representation of the approving signature, controller means for creating a digitized transaction record by merging or otherwise associating the signature record with the debit record, and encryption means for encrypting at least the signature portion of the transaction record.

In accordance with one embodiment of the invention, the capture means comprises a transparent reference surface connected for generating position sensing signals in response to moving contact by the stylus. The reference surface is mounted on a display which presents a visual image of the signature as it is written. The image of the signature is visible to the signer and is presented in registration with the movement of the stylus.

Further in accordance with this invention there is provided a method for processing a customer charge or account debit transaction wherein data concerning the transaction is entered into a point of sale terminal by a cashier. This data is digitized and presented to the customer on a display in a format including a signature block. The customer signifies approval of the transaction using a stylus to write a signature in the signature block. The signature is captured and displayed to the customer as the signature is written. A signed transaction record is then printed, as desired, and presented to the customer. Thereafter the signature is encrypted, preferably using a unique transaction-identifying code as an encryption key. The encrypted file may then be encrypted a second time for security purposes and appended to a digitized but non-encrypted record of the transaction. Thereafter the entire record may be transmitted to a bank, automated clearing house or other financial institution for decryption and billing or account debit.

It is accordingly an object of the invention to provide a method and system for processing signature based payment transactions in an efficient manner.

Another object is to provide an improved method and system for processing signature-based payment transactions by use of digitized representations of payment documents.

Another object is to provide a method and system for generation and signature of an electronic payment document which is easily usable by and readily acceptable to a customer.

Another object of the invention is to provide a method and system for electronic generation and electronic signature of a payment document with sufficient security to obviate the need for maintenance of paper records.

Yet another object of the invention is to provide a digital record of a commercial transaction which is secure from tampering.

With these and other objects, which will become apparent from the following description, in view the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 6 is an illustration of a combined bill of sale and credit receipt printed at a point of sale.

DETAILED DESCRIPTION

Figure 1:
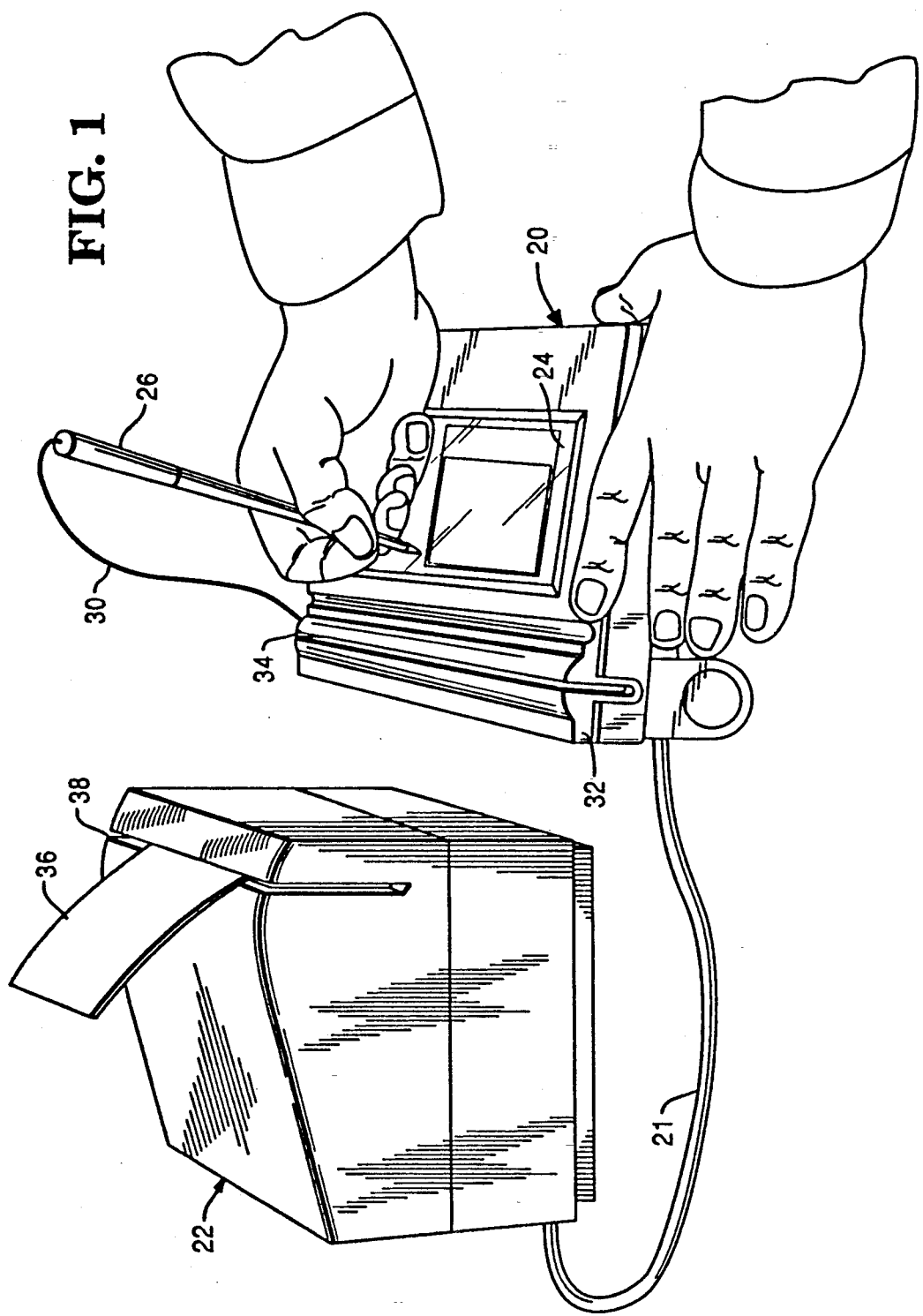
FIG. 1 is a perspective view of a write input apparatus and associated printer.

Reference now is made to FIG. 1, wherein there is shown a perspective view of a write input apparatus 20 which is coupled to a printer 22 by a connector 21. Although this is shown as a direct connection or coupling, the actual coupling or connection may actually extend through one or more other devices, such as a controller. The write input device includes a transparent surface 24 through which information may be displayed and on which information may be entered by writing thereon with a stylus 26 by a human operator 28. The stylus 26 is connected to the apparatus by an electrically conductive line 30. The apparatus 20 may also include an integral magnetic stripe reader 32 having a slot 34 through which a card bearing magnetic indicia may be swiped so that the data contained thereon may be read, stored and used by the system. The write input device 20 may be configured without the magnetic stripe reader 32, if desired. Thus the present invention contemplates the use of a device for manual data entry instead of or in addition to the magnetic stripe reader. Also, the system may include a MICR reader for reading magnetically imprinted characters on a customer's personal check. This would enable the use of a personal check for identification of a customer's checking account number.

Printer 22 may print customer receipts such as the receipt 36 which is shown as issuing from an aperture 38 in the housing of the printer. Details of receipt 36 may be as illustrated in FIG. 6. Other types of records could also be generated by the printer 22, if desired, in response to the needs of the system. Any suitable printer may be employed, such as an Epson RP265, marketed by Epson America, Inc., Torrance, Calif.

Figure 2:
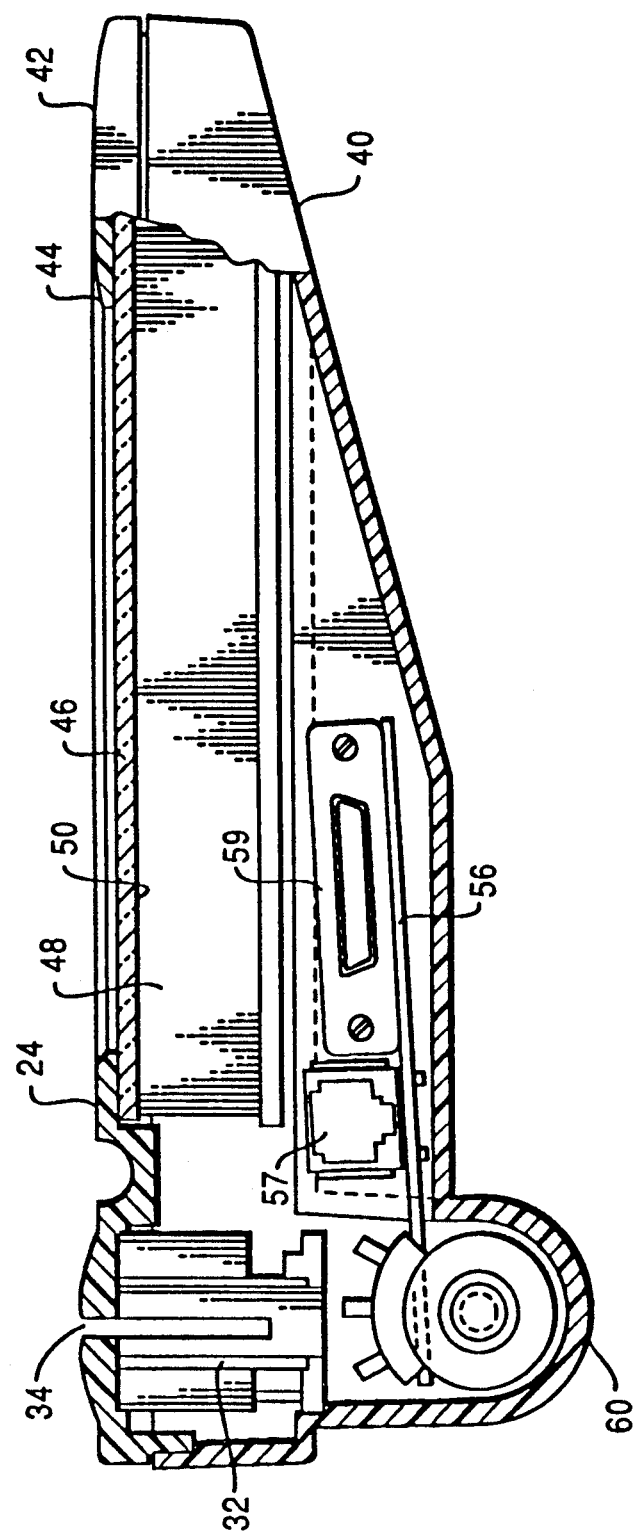
FIG. 2 is a sectional elevational view of the write input apparatus of FIG. 1.

As shown in the sectional view of FIG. 2, write input apparatus 20 has a lower housing 40 and an upper housing 42, which mate along the edges thereof. The upper housing 42 has an aperture 44 within which is placed a transparent interactive digitizer element 46 which is capable of generating electrical signals which represent the position of the stylus 26 or other device placed in contact therewith. Broadly speaking, during operation of the interactive element 46, the stylus 26 acts as a probe and the differing potentials between sides of the element, in two coordinate directions, are measured, converted into digital form, and are processed through correction algorithms. This enables a trace of the movement of the stylus to be captured and retained, as well as displayed on a liquid crystal display (LCD) module 48. Interactive elements of this type are commercially available, and one such device which can be employed in the present invention is a controller/digitizer/pen marketed by MicroTouch Systems Inc., Wilmington, Mass. under the trademark ScreenWriter.

Positioned directly beneath the interactive transparent element 46 and having a display screen visible therethrough is the liquid crystal display (LCD) module 48 which is capable of displaying information in response to electrical signals applied thereto. Information which is read from a card by the magnetic stripe reader 32, or input by a Magnetic Ink Character Recognition (MICR) device, or manually entered through a keyboard may be supplied to and displayed by the LCD module 48. Also, a magnetically encoded card or a keyboard may be used for accessing a lookup table in a memory to generate information for displaying graphics on the screen of the LCD module 48. Electrical signals from the interactive element 46 relating to movement of the stylus 26 on the element can then be applied to the LCD module 48 to provide a representation of a signature on the transaction image. Thus, since the LCD module 48 is positioned directly beneath the transparent digitizer element 46, the movements of the stylus 26 on the transparent surface 24 are graphically captured and are immediately visible at the points of contact of the stylus with the surface. Other transaction information may also be manually entered via the write capture surface in the same manner as the signature except that its position is correlated to an input grid displayed through the transparent surface for input prompt, e.g., numeric keypad image. Such information is recognized from its position and is digitized accordingly.

Figure 3:
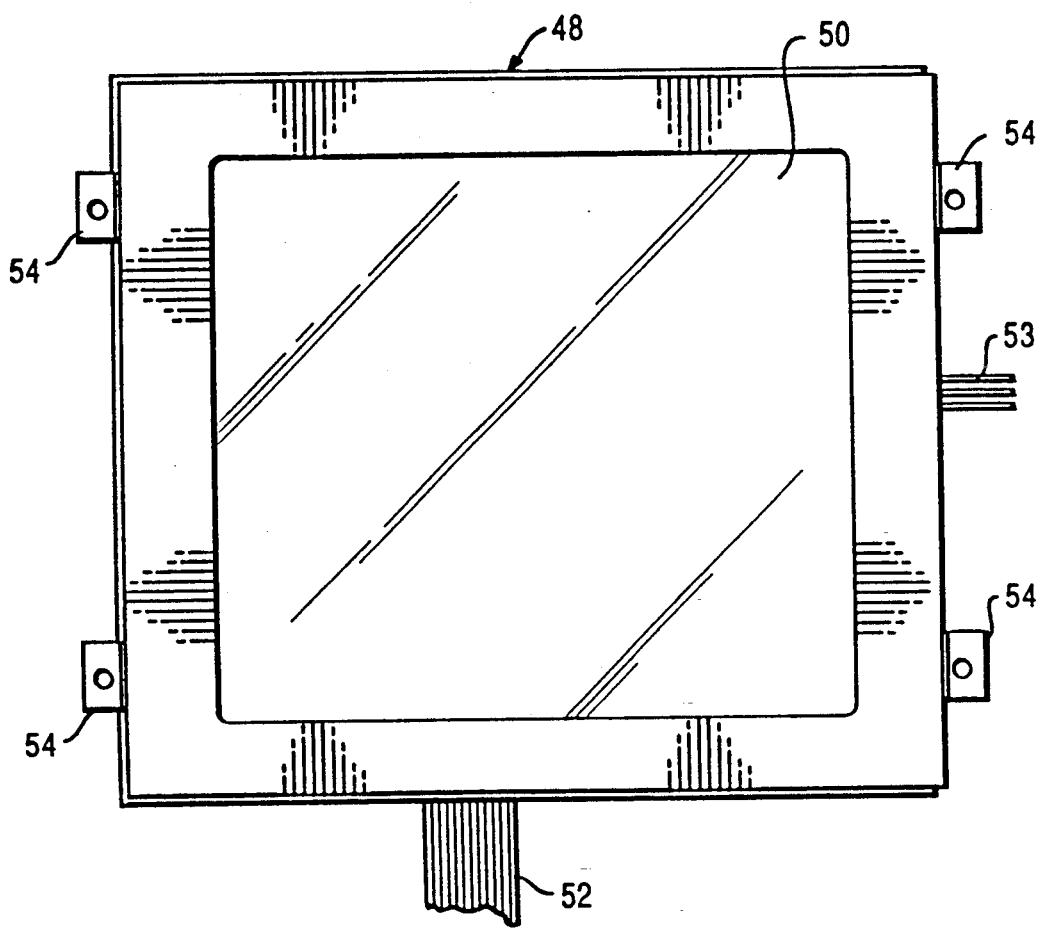
FIG. 3 is a plan view of a liquid crystal display module which is used in the write input apparatus.
Figure 4:
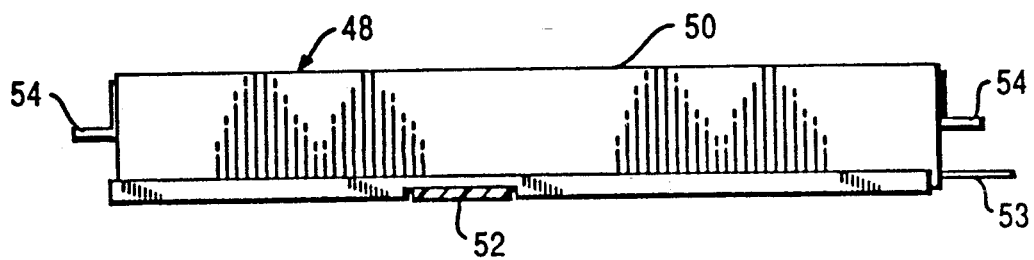
FIG. 4 is an elevational view of the liquid crystal display module of FIG. 3.

FIGS. 3 and 4 are plan and elevation views of the LCD module 48. A display screen 50 forms part of the top surface of the module. A cable 52 provides electrical input connections for supplying power and data signals to the module. Electrical conductors 53 provide power to fluorescent tubes for back-lighting the screen 50. Brackets 54 are secured to the module to enable it to be mounted securely within the apparatus 20. LCD modules of this type are commercially available, and one such module which can be employed in the present invention is Model EG7500, marketed by Epson America, Inc., Torrance, Calif.

The magnetic stripe reader 32 and its slot 34 are shown to be located in the upper left portion of the apparatus 20, as viewed in FIG. 2. A control circuit board 56 which functions as a controller for the transparent digitizer element 46 is located below the LCD module 48 in the lower housing 40 of the apparatus 20 and includes a connector 57 for connection to the digitizer element 46 and also includes a microcontroller 64. Circuit board 56 may include circuitry for automatically adjusting the contrast control signal applied to LCD module 48 to correct for temperature induced variations in the contrast of the display.

Figure 5:
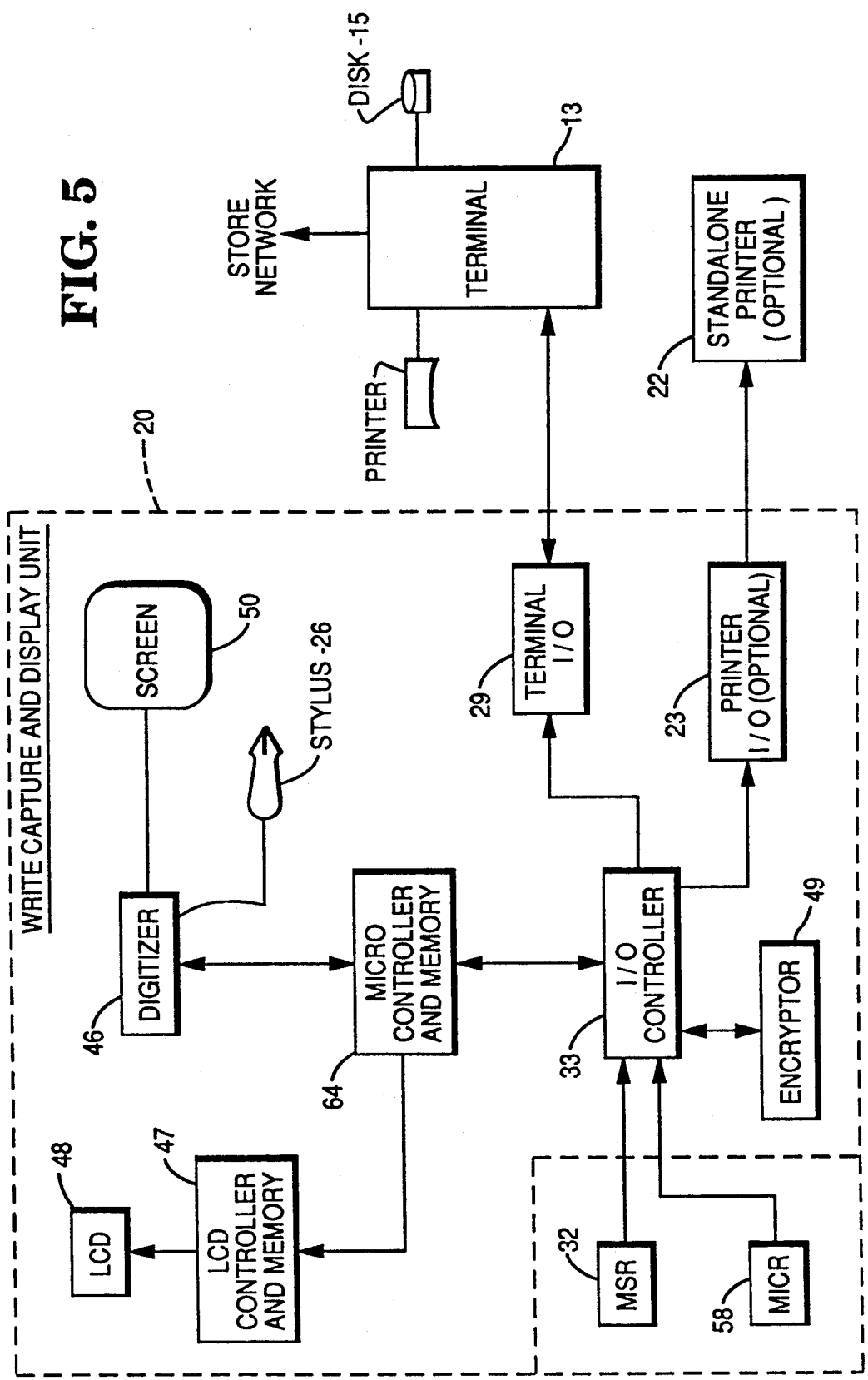
FIG. 5 is a block diagram of a point of sale system which includes the write input apparatus.

A point of sale system using the present invention is illustrated in block diagram form in FIG. 5. The system as shown therein includes the write capture unit 20, a transaction terminal 13 and the optional standalone printer 22. MSR 32 which is shown in phantom outline within write input unit 20 may be integrated as part of that unit or may be a standalone device. An optional MICR reader 58 is also shown in phantom outline. The transaction terminal 13 may be any one of a number of commercially available devices, such as, for instance, a 7052 terminal, marketed by NCR Corporation. The optional standalone printer may be of any suitable dot matrix printer offering an RS232 interface, such as the NCR 7150 printer.

Terminal 13 controls the functioning of write input device by means of commands sent over a serial data link 14. These control commands are received by an input/output buffer 29 and relayed to a microprocessor based I/O controller 33 for routing to the microcontroller 64. Microcontroller 64 runs one or another of four different programs, as selected by control messages from terminal 13. Basically, there are four types of messages:

DISPLAY
ACCEPT
TRANSMIT
UPDATE

DISPLAY messages may include character codes for characters to be displayed by LCD module 48. These codes are sent by microcontroller 64 to LCD controller 47, which may be, for instance a Display Master Model YDM420 graphics adapter marketed by Yamaha Corporation of America, San Jose, Calif. LCD controller 47 then converts the character codes into row and column commands for displaying the desired characters in dot matrix form. Alternatively, DISPLAY messages may cause microcontroller 64 to access its own memory for character codes stored therein and send those codes to LCD controller 47 for display.

ACCEPT messages activate logic that causes microcontroller 64 to sense the activation of stylus 26 and begin accepting X,Y coordinate from digitizer 56. This information is captured and "echoed" to the LCD 48 to provide a signature display to the signer in "real time".

Receipt of a TRANSMIT message initiates transmission of the signature information to the transaction terminal along with other account information obtained from the debit card read by the MSR 32. MSR input is also controlled via ACCEPT messages. Encryption means 49 are provided for encrypting the signature information prior to transmission to terminal 13. Encryption means 49 may be implemented either in hardware or in software.

The UPDATE messages are used for causing microcontroller 64 to update its memory.

Upon receipt of the signature information, the terminal may send the data over communication links to a validation point for signature validation and transaction approval. Validation may be done by the human eye or by automatic signature recognition equipment. The electronic charge or debit draft information is stored locally on disk 15 for later retrieval and batch transmission to an Automated Clearing House (ACH) or other financial institution for processing. Storage is in encrypted form. For customer records, paper media of the transaction may be provided either by the terminal 13 or optionally by printer 22. A printer interface unit 23 may be provided for this purpose.

As hereinafter described in detail, a uniform message format is used in messages from terminal 13 to I/O controller 33. This message includes a one-byte field BCC which is created by performing an EXCLUSIVE OR operation on other fields which specifically identify the transaction. BCC may be used as an encryption key for encoding the digitized signature and other transaction data, as desired.

In the preferred embodiment of the invention only the signature is encrypted so as to enable the system to be used in an environment including a wide variety of other types of electronic debit equipment. It is contemplated that a transaction-specific encryption key, such as BCC, will be used so as to associate the signature with a particular transaction and thereby discourage fraudulent use of a signature which may have been obtained legitimately in connection with a different transaction. By way of example an account debit may be made in reliance upon an electronically captured signature as illustrated in FIG. 6A.

Figure 6A:
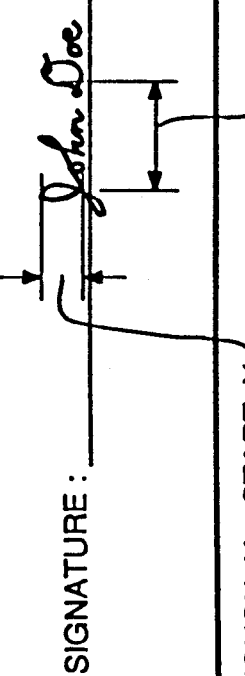
FIG. 6A is an illustration of a debit memo produced at a point of sale.

FIG. 6A represents an LCD display which may be created in connection with a debit transaction or a hard copy thereof as printed by printer 22. It will be seen that the display includes a transaction code consisting, for example, of two hexadecimal words FB3C and 27A6. The first word might identify a particular merchandising location and perhaps a time identifier, whereas the second word could be a sequentially assigned number. Thus the code could refer to transaction number 27A6 by store number FB during week 3C.

The authorizing signature is captured dynamically as a series of time related X-Y coordinates during actual writing by the customer. This provides a much better record for later verification than a frozen, picture-type signature of the type produced by ordinary bit-mapping. Capturing of the signature begins upon contact of the stylus 26 with digitizer screen 46, at which time a pair of starting coordinates, Start_X and Start_Y are generated. These coordinates are compared with a series of subsequent coordinates Touch_X and Touch_Y which are sensed at regularly timed intervals. The X and Y differences are stored as a series of digital words.

After the signature is captured it is encrypted in two phases. In the first phase the two words of the transaction code are subjected to an exclusive OR operation (XOR) to obtain a single word encryption key; in this case the key is found to be DC9A. This key then is XORed against the signature data to obtain an encrypted signature file. This effectively imbeds the transaction identification code into the signature.

The second phase of the encryption process adds security by using a sophisticated encryption technique such as the Data Encryption Standard (DES) issued by the U.S. National Bureau of Standards. This phase uses secure encryption keys known only to the merchant and the financial institution.

At the time of posting the financial institution will first decrypt the DES encryption. Then, since the basic transaction data has not been encrypted, the transaction code may be read and XORed to obtain the DC9A XOR key. This key then is XORed against the signature file to obtain a readable copy of the authorizing signature. Since the signature copy cannot be produced except with the aid of the transaction code, the financial institution knows that the signature was written at the time of the transaction. Consequently the financial institution may safely debit the customer's account for the amount of the transaction. Of course, it is also necessary for the financial institution to authenticate the decrypted signature by comparing it against a sample signature obtained upon opening the account. As noted above, the dynamically recorded signature file obtained through use of this invention facilitates automatic signature recognition.

A "C" language routine for accomplishing the above described EXCLUSIVE OR operation is taught in "Advanced Turbo C", 2nd Ed, Herbert Schildt, Borland Osborne/McGraw-Hill 1989 at pp. 265, 266. DES encryption is well known. It uses a 64 bit key and is best performed by a specially configured "hardware" encoder. However, it may be carried out in software, if desired. An example of a software implementation of DES encryption in "C" language is given in "Numerical Recipes in C, The Art of Scientific Computing", Press et al. Cambridge University Press, 1989, pp. 228–236.

Figure 7:
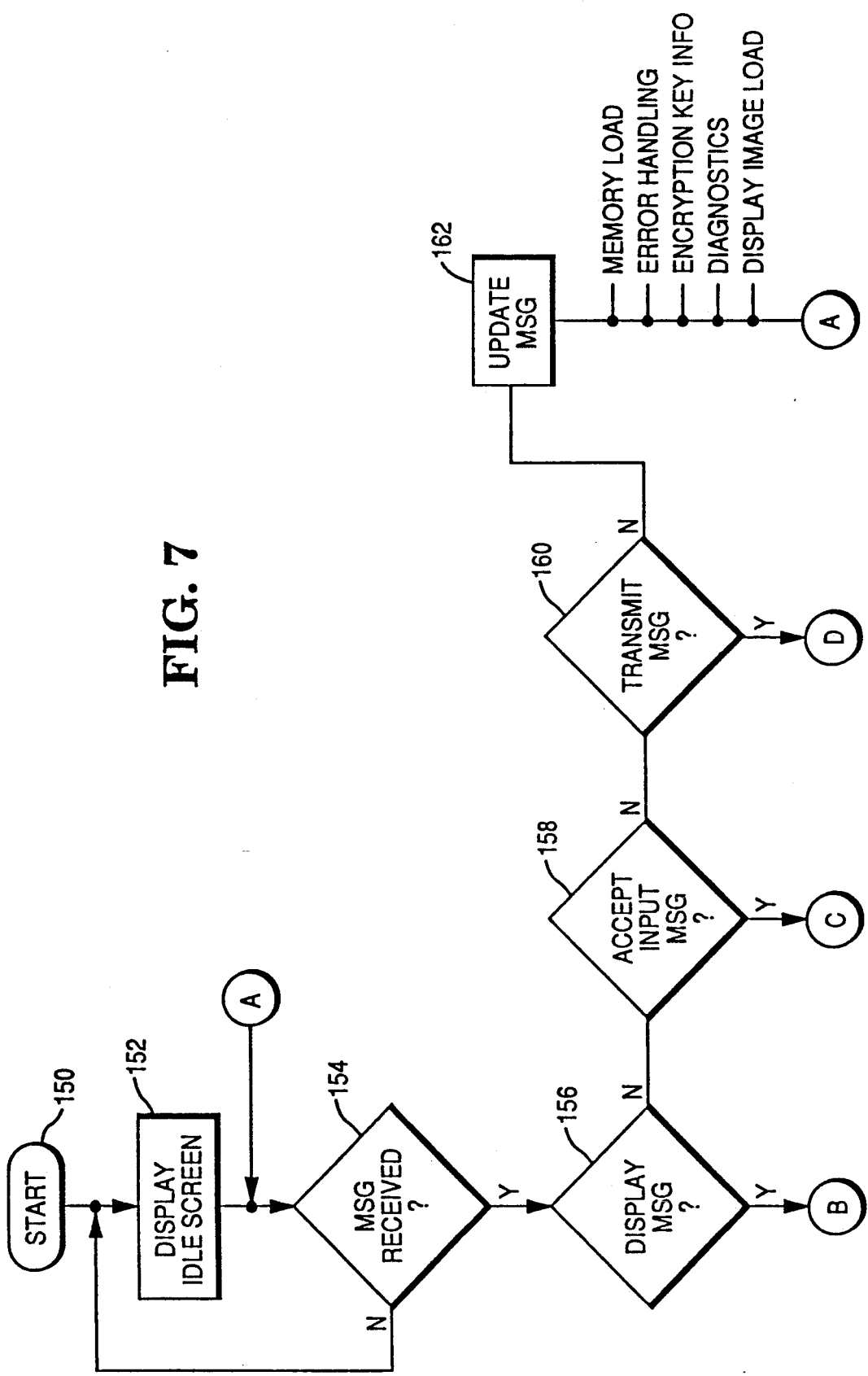
FIGS. 7, 7A, and 7B make up a flow chart illustrating the production of a digitized transaction record such as the debit memo of FIG. 6A.
Figure 7A:
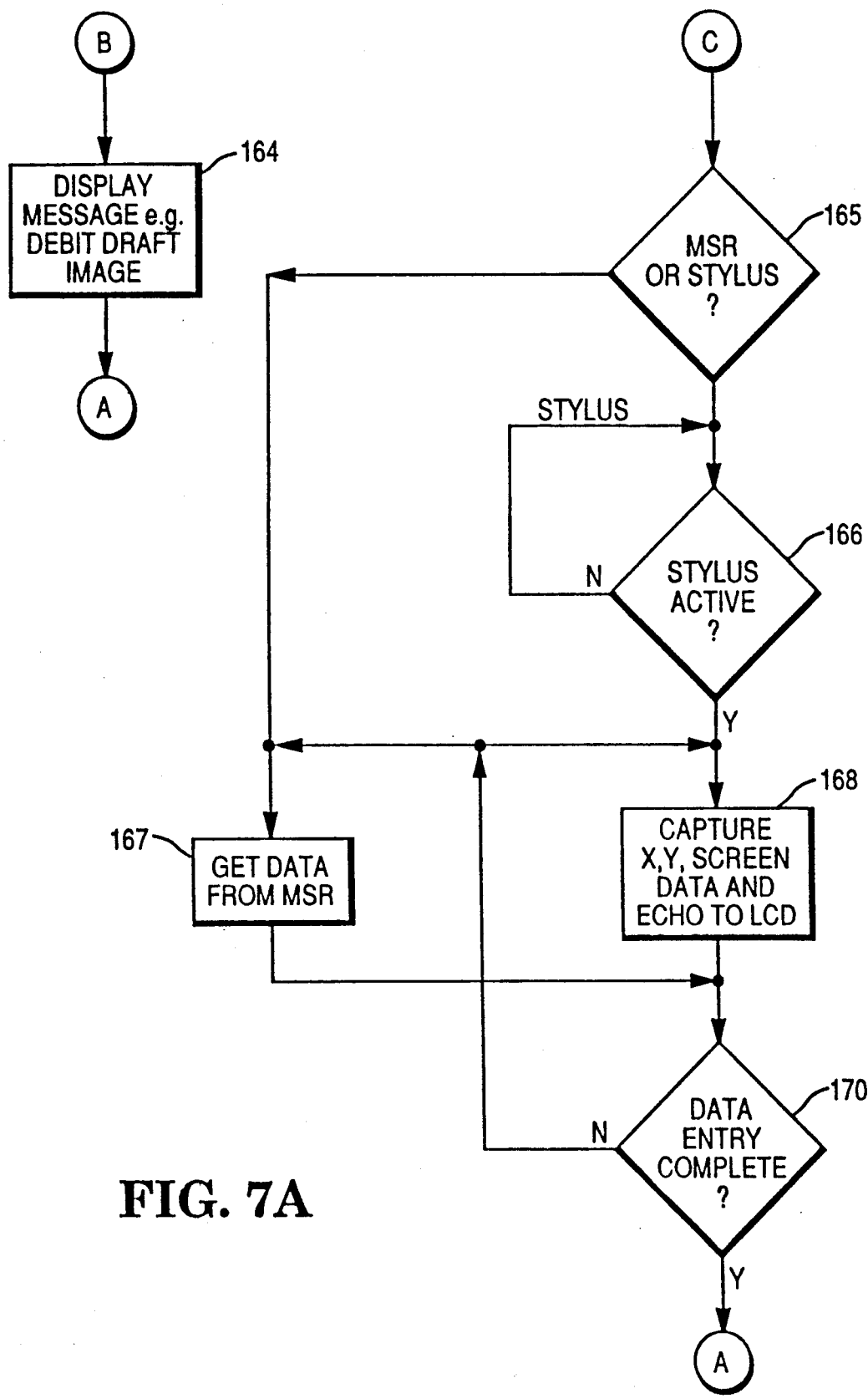
Figure 7B:
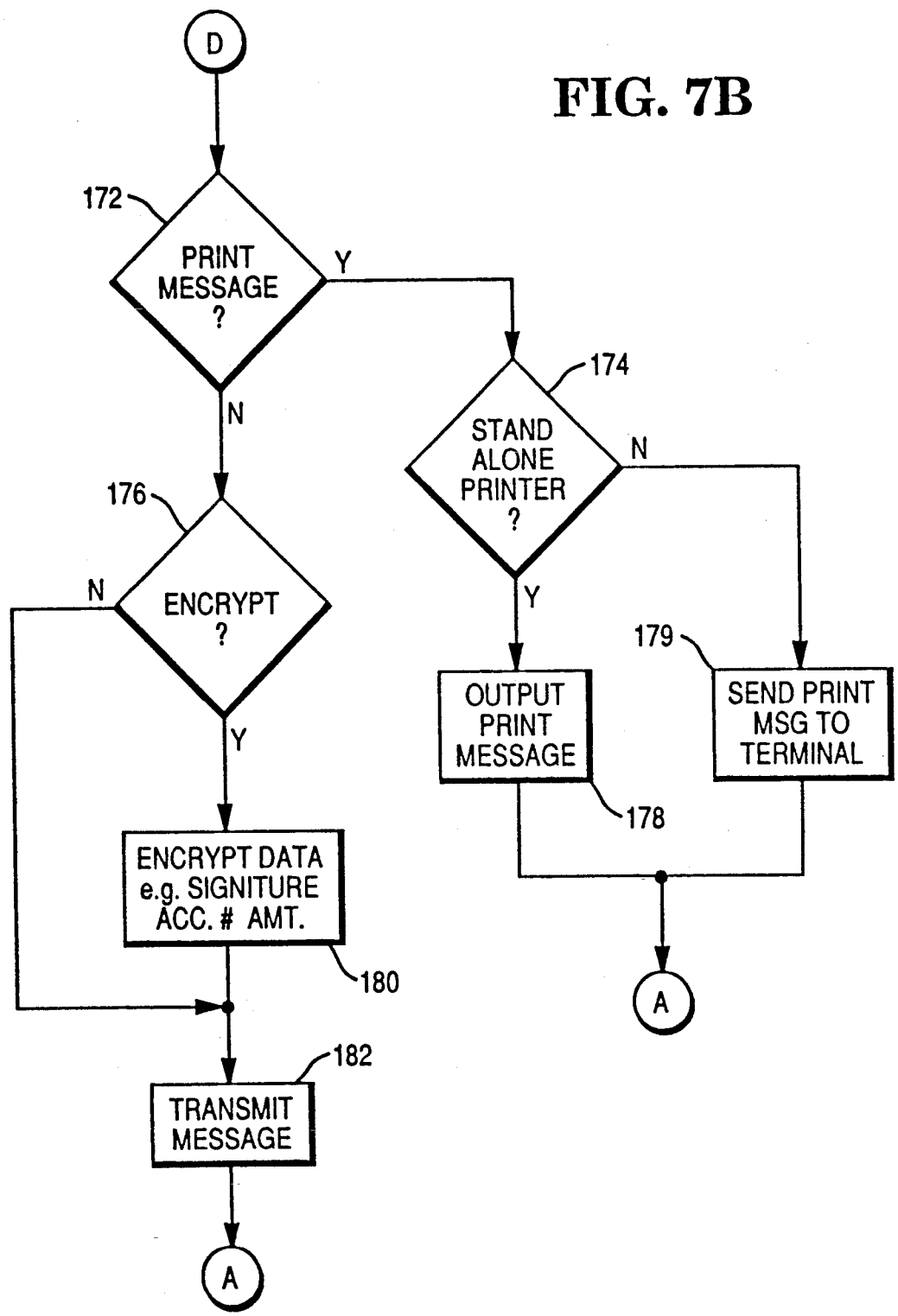

The manner in which the system performs a point of sale transaction will now be described with reference to the flow diagram of FIG. 7. As illustrated therein, the sequence begins at start block 150 which is the powerup condition. The idle screen, as defined by the processor program is displayed (152). The idle loop continues until a message is received from the terminal, block 154. The message can be any of the four general types mentioned above. The type of message is identified by the decision three indicated at 156, 158, 160 for DISPLAY, ACCEPT and TRANSMIT. A failure at all three points produces an UPDATE response, as shown at 162. If the message is a DISPLAY message, the information in the message, or the stored information designated by the message, is displayed on the LCD 64. The program then returns to the idle loop.

If the message is of the ACCEPT type, then the program checks to determine whether the input is to be via MSR or stylus input 165). If it is to be by stylus, then the program checks for stylus activation (166). If the stylus has been activated, the system proceeds to capture the signature data and echo to the LCD (block 168). This continues until a terminal command or a stylus deactivation indicates that the data entry is complete (170). If the test at 165 indicates that data is to be accepted from the MSR then the system proceeds to block 167 where the magnetic data is read. When the magnetic input is complete, the information is stored and the program returns to idle loop.

If the message is of the TRANSMIT type, the program checks (172) to determine whether the message is a print command. If so, a check is made at 174 to determine whether the printing is to be done by the standalone printer or by the terminal. At this point the transaction data is formatted and printed by the appropriate device as shown at block 178 and 179. Thereafter if the test at 172 indicates that the message is not a print instruction, the program determines if encryption is required (176). The transaction data is encrypted, if appropriate (180) and sent to the terminal (182). Thereafter the program returns to the idle loop. If the message is of the UPDATE type, the specific request is determined and appropriate action is taken after which the program returns to the idle loop.

A common format is used for all messages from terminal 13. It is as follows:

| VL1 | FC | DATA | BCC |
| --- | --- | --- | --- | where:

VL1 is a two-byte length of the data portion of the message. The first byte of the VL1 field is the upper eight bits of the data field length and the second byte is the lower eight bits of the data field length.

FC is a one-byte function code which specifies the message type and the particular function to be performed.

DATA is a variable length field of characters that are associated with the function code. This is an optional field and may not be present in every message.

BCC has been mentioned above and is a one-byte field that is the EXCLUSIVE OR of the VL1, FC, and DATA fields.

Responses by write capture unit 20 to terminal 13 follow the same format with exception that the FC field is used to return the status of the operation that was requested. The DATA field is also an optional field that may or may not be transmitted to the terminal depending on the type of response.

The following are examples of various message types:

| Message Type | Codes | Function Description |
| --- | --- | --- |
| Transmit | 01 | Transmit Encrypted Signature Record |
| Transmit | 02 | Transmit Printable Signature Data |
| Accept | 03 | Accept Signature Data |
| Transmit | 04 | Transmit x, y Touch Screen Data |
| Transmit | 05 | Resend Last Response |
| Update | 06 | Signature Completion Indication |
| Transmit | 07 | Transmit Diagnostic Tallies |
| Transmit | 08 | Transmit Firmware/Software Identification |
| Update | 09 | Reset Write Capture Unit (Perform Level 0 Diagnostics) |
| Update | 0A | Accept New Program Load |
| Accept | 0B | Accept MSR Data |
| Accept | 0C | Accept MICR Data |
| Display | 11 | Display Stored Image #1 |
| Display | 12 | Display Stored Image #2 |
| Display | 13 | Display Stored Image #3 |
| Display | 22 | Display Full Screen #1 |
| Display | 23 | Display Full Screen #2 |
| Display | 31 | Enter Customer Display Mode |
| Display | 32 | Display Text (Customer Receipt) Data |
| Accept | 41 | Accept Card Image #1 Data |
| Accept | 42 | Accept Card Image #2 Data |
| Accept | 43 | Accept Card Image #3 Data |
| Accept | 52 | Accept Full Screen #1 Data |
| Accept | 53 | Accept Full Screen #2 Data |
| Update | 71 | Receive Encrypted Working Key |
| Update | 72 | Receive Key Exchange Key |
| Update | 77 | Receive/Continue Load for Key Exchange Key |
| Transmit | 78 | Transmit for Key Status |
| Update | 81 | Perform Communications Turnaround Test |
| Update | A1 | Perform Battery Test |
| Update | D1 | Download Record to LCD Memory |
| Update | D6 | Download Record to Processor Memory |
| Update | DC | Download Character Set |
| Update | D8 | Echo Data to LCD from MSR, Digitizer or MICR Card |

In order to display stylus generated information on the LCD module 48, it is necessary to transform the digitizer coordinates into the coordinate system of the LCD module. This process is performed by the PC controller 64. The process used to accomplish this transformation is illustrated in the flow diagram of FIG. 8. Performance of this process is dependent upon obtaining certain constants which are used in equations for this transformation. The process for obtaining these constants is shown in FIG. 9, which will be described subsequently.

Figure 8:
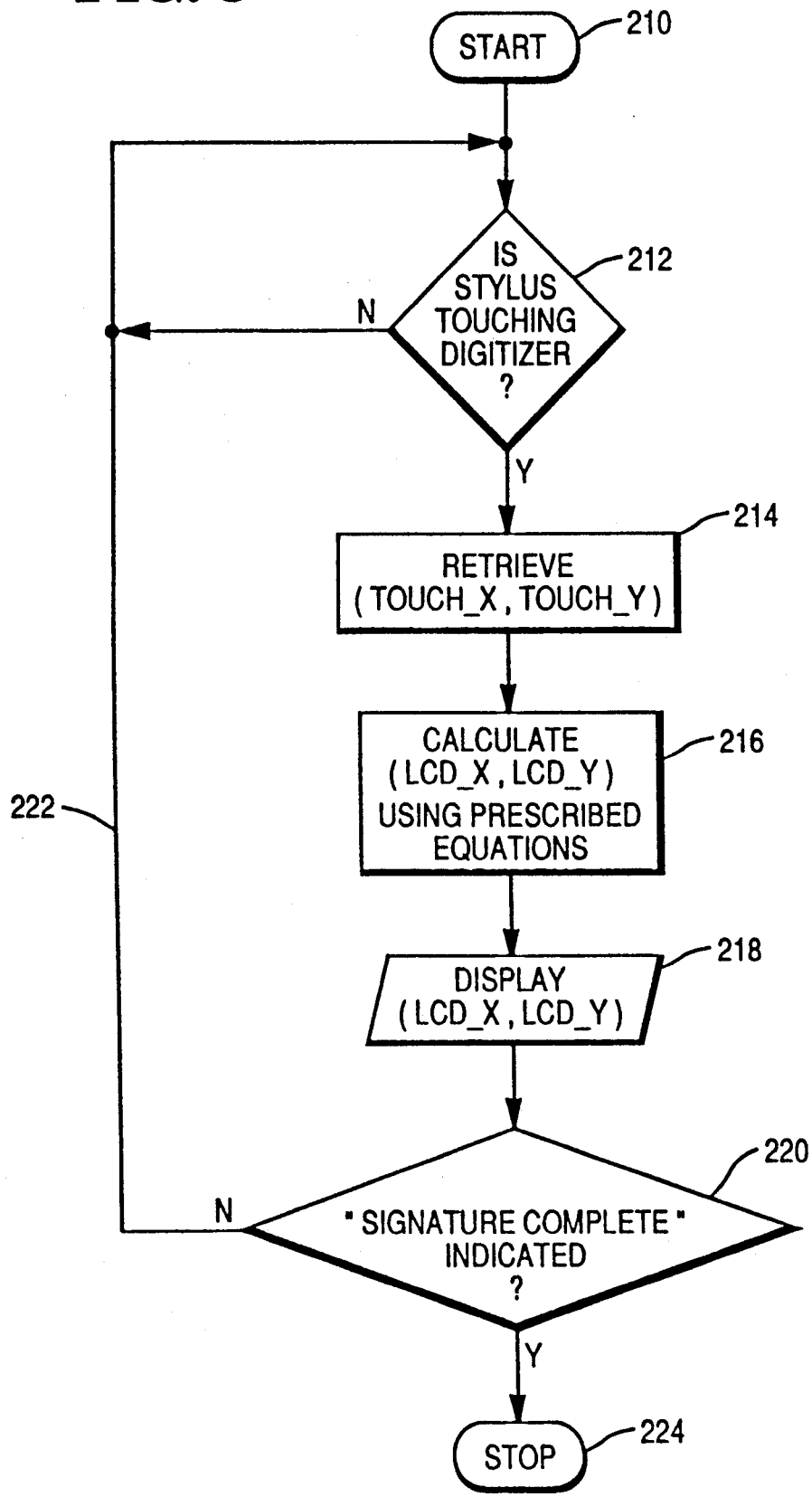
FIG. 8 is a flow diagram of the process employed to transform the coordinates of a position of a transparent digitizer to the corresponding coordinates of a display module.
Figure 9:
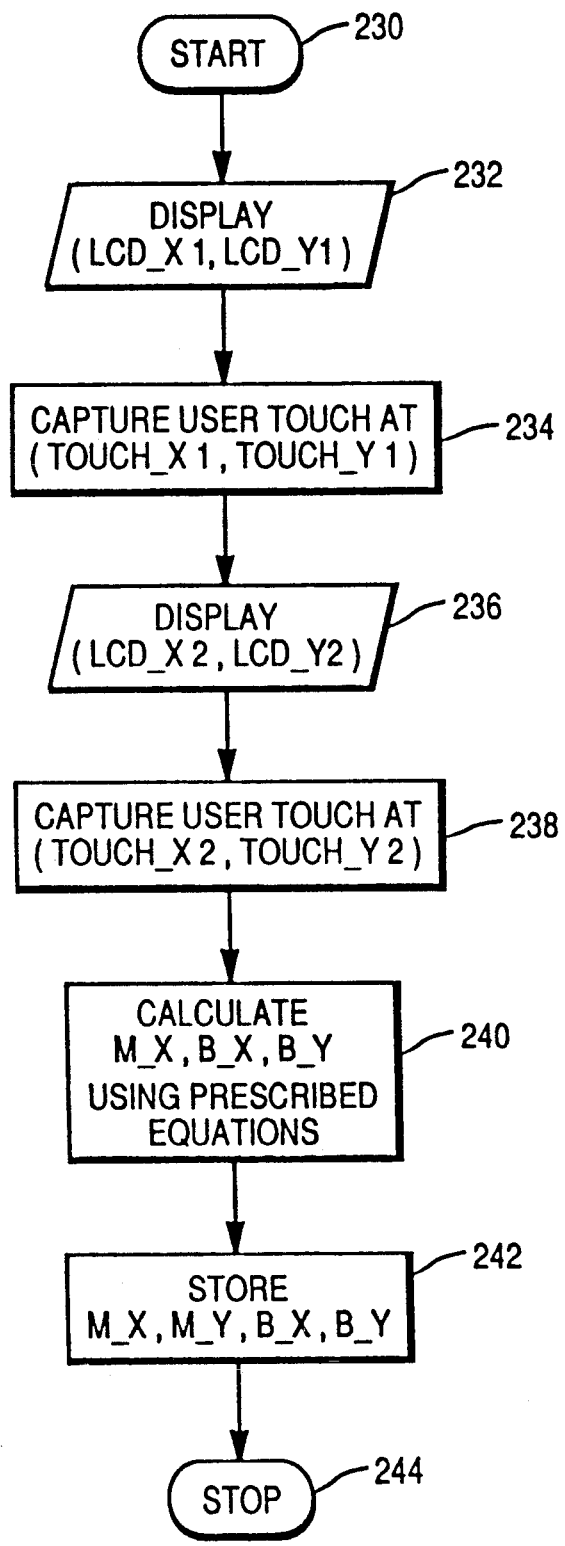
FIG. 9 is flow diagram of the process employed to provide offset values used in the process of FIG. 8.

The process of FIG. 8 begins with start block 210, and then proceeds to block 212 in which an inquiry is made as to whether the stylus 5 is touching the digitizer 2. The process does not continue until the stylus does touch the digitizer. When the stylus is touching the digitizer, the process continues to block 214, in which the transparent digitizer coordinates "touch_X" and "touch_Y" are determined and transmitted by the transparent digitizer controller included in block 56 to the PC controller 64. These coordinates represent the instantaneous position of the stylus 26 on the screen 46, taken at periodic time intervals during movement of the stylus.

The corresponding positional coordinates "lcd_X" and "lcd_Y" for the LCD module 48 are then calculated from "touch_X" and "touch_Y", as represented in block 216. This transformation is accomplished by use of the following equations:

$$lcd\_X = mx^* touch\_X + bx \quad\quad 1.$$

$$lcd\_Y = my^* touch\_Y + by \quad\quad 2.$$

where
lcd_X, lcd_Y are display coordinates,
touch_X, touch_Y are digitizer coordinates,
mx, my are scalar constants,
bx, by are offset constants.

The method for determining mx, my, bx and by will be described subsequently in connection with the flow diagram of FIG. 9.

The process continues to block 218 where lcd_X and lcd_Y are described on LCD module 3. An inquiry is then made (block 220) as to whether a "signature complete" indication has been made, which may be indicated a signal generated in the write input apparatus 20 when the signer places the stylus in a designated holder. If the signature is complete, the process is concluded (block 224). If the signature is not complete, the process continues via path 222 to block 212.

The constants mx, my, bx and by are determined in accordance with the process set forth in the flow diagram of FIG. 9, which proceeds from the start position 230 to display a first point at predetermined LCD module screen coordinates "lcd_X1" and "lcd_Y1", as represented in block The user then touches this displayed point with the stylus 26, thus yielding corresponding digitizer coordinates "touch_X1" and "touch_Y1", as represented in block 234. A second predetermined point, physically spaced from the first predetermined point, at coordinates "lcd_X2" and "lcd_Y2" is then displayed (block 236). The user then touches this second displayed point with the stylus 26, thus yielding corresponding digitizer coordinates "touch_X2" and "touch_Y2", as represented in block 238. For maximum accuracy, the two predetermined points should be at opposite corners of the planned active area of the screen of the LCD module 3.

The quantities mx, my, bx and by are then determined, as represented in block 240, in accordance with the following equations:

$$mx = (lcd\_X1 - lcd\_X2)/(touch\_X1 - touch\_X2) \quad\quad 3.$$

$$b\_x = lcd\_X1 - mx^* touch\_X1 \quad\quad 4.$$

$$m\_y = (lcd\_Y1 - lcd\_Y2)/(touch\_Y1 - touch\_Y2) \quad\quad 5.$$

$$b\_y = lcd\_Y1 - my^* touch\_Y1 \quad\quad 6.$$

These constants (mx, my, bx and by) are then stored and used to calculate display coordinates from any subsequent digitizer coordinates, as per block 242. The process is then concluded at block 244.

The system and method of the present invention have been disclosed herein primarily in connection with an arrangement for signature-based payment transactions. However the invention is not limited to such an arrangement and could be used in connection with other transactions requiring authorization by a digitized signature. This might include, for example, a written order for a public servant to perform an official act.

It will also be appreciated that while a method and apparatus have been disclosed for creating a transaction-specific encryption of a signature, the invention contemplates quasi specific encryption such as could be accomplished by use of an encryption key which is changed frequently so as to enable an encrypted signature to be correlated with time.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Apparatus for producing a verifiable, signature approved, digital record of a commercial transaction comprising:
   means for creating a digital record of a transaction including a debit authorization;
   means for capturing a digital representation of a handwritten approving signature at the time of said transaction; and
   means for using said digital record to encrypt said digital representation.

2. Apparatus according to claim 1 wherein said means for capturing comprises a manually operated stylus and a digitizer for sensing and digitizing the coordinates of said stylus.

3. A digital record of a transaction comprising a recording medium impressed with digitized transaction data defining said transaction and an encrypted digital record of an approving handwritten signature for said transaction; said encryption record requiring a decryption key which may be obtained from said transaction data.

4. A digital record according to claim 3; said encrypted record requiring a second decryption key independent of said transaction data.

5. A method of processing a customer sales transaction comprising the steps of:
   entering data defining said transaction into a terminal;
   displaying a business form including said data on a display screen;
   directing the customer to sign said business form on said display screen;
   capturing and digitizing the signature of the customer;
   encrypting said signature;

printing a hard copy of said business form including a readable copy of said signature for submission to the customer; and creating a digital record of said transaction including an encrypted copy of said signature.

6. The method of claim 5 and further comprising the steps of:
   entering a transaction identifying code into said terminal; and
   using said transaction identifying code to encrypt said signature.

7. The method of claim 5 wherein a customer account number is entered by sensing a magnetic record thereof on a card presented by the customer.

8. The method of claim 5, wherein a customer account number is entered by means of a keyboard.

9. The method of claim 5, wherein a customer account number is entered by sensing data on a bank check.

10. The method of claim 5, further comprising the step of displaying said particulars on said display screen.

11. The method of claim 5, wherein said business form is a receipt of charge.

12. The method of claim 5, wherein said business form is a debit draft.

13. The method of claim 12 wherein said debit draft is a bank check.

14. A method of processing customer charge and debit account transactions using apparatus which includes a cashier-operated point of sale (POS) terminal, a printer and a customer-operated write input device having a touch-sensitive display screen and a card reader, comprising the steps of:
   (a) displaying an idle condition of said screen;
   (b) operating said terminal to initiate the start of a transaction by the cashier;
   (c) entering data concerning items of a transaction into said terminal;
   (d) displaying data concerning said items on said display screen;
   (e) operating said terminal to indicate entry of the last item of a transaction;
   (f) entering customer account data into said terminal;
   (g) obtaining the signature of the customer on said write input device;
   (h) encrypting said signature;
   (i) operating said printer to print a transaction record;
   (j) displaying a transaction record on said display screen; and
   (k) creating and storing a transaction record in digital form, including an encrypted copy of said signature.

15. A method of processing a sales transaction comprising the steps of:
   activating a display at a sales location to present an image of transaction related data;
   manually moving a position indicating device in a cursive manner corresponding to the writing of a personal validating signature;
   sensing a series of positions of said position indicating device and generating a series of corresponding position coordinates;
   creating a digital record of said signature by storing said coordinates in a memory;
   using said coordinates to cause said display to present an image of said signature concomitantly and in a predetermined spaced relation with the image of said transaction related data;
   encrypting said signature; and
   storing a copy of said signature in encrypted form.

16. A method of processing a sales transaction comprising the steps of:
   capturing an authentic signature for use in approving debit entries against a specified account;
   creating a first data file containing a debit record for positing against said account;
   capturing an image of a validating handwritten signature at the time of said transaction;
   creating a second data file containing a digitized representation of said image;
   creating an encryption key which uniquely identifies said transaction;
   using said encryption key for encryption of said second file;
   storing said first file;
   storing said second file in encrypted form;
   retrieving said files from storage;
   decrypting said second file to recover said validating signature;
   comparing said validating signature against said authentic signature, and
   posting said debit record against said account if and only if said comparing step establishes a predetermined similarity between said validating signature and said authentic signature.

17. Transaction recording apparatus comprising:
   transaction input means for creating a digitized transaction record including information defining a business transaction;
   stylus means for manual movement corresponding to the writing of an approving signature for said transaction;
   liquid crystal display means for presenting a visual image of said signature;
   capture means including a transparent reference surface connected for generating position signals in response to moving contact by said stylus and mounted on said display means for causing said visual image to be written in registration with the moving point of contact between said surface and said stylus means;
   controller means connected to said transaction input means and to said capture means for associating said transaction record with said signature record; and
   encryption means connected to said controller means for encrypting said signature record.

* * * * *

UNITED STATES PATENT AND TRADEMARK OFFICE
CERTIFICATE OF CORRECTION

PATENT NO. : 5,195,133
DATED : March 16, 1993
INVENTOR(S) : Michael A. Kapp, Robert L. Protheroe, Albert Onega It is certified that error appears in the above-identified patent and that said Letters Patent is hereby corrected as shown below:

Column 1, line 9, Ser. No. "07/575,069" should read --07/575,096--.

Column 1, line 10, delete ", now U.S. Pat. No. 5,153,261".

Column 12, Claim 16, line 17, "positing" should read --posting--.

Signed and Sealed this

Twenty-fifth Day of January, 1994

Attest:

BRUCE LEHMAN

Attesting Officer

Commissioner of Patents and Trademarks